United States Patent
Sterland et al.

(10) Patent No.: US 8,505,070 B2
(45) Date of Patent: Aug. 6, 2013

(54) SEPARATE SCRIPT CONTEXT TO ISOLATE MALICIOUS SCRIPT

(75) Inventors: Andy R. Sterland, Seattle, WA (US); David L. Risney, Jr., Redmond, WA (US); Scott B. Graham, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 61 days.

(21) Appl. No.: 13/228,346

(22) Filed: Sep. 8, 2011

(65) Prior Publication Data

US 2013/0067585 A1    Mar. 14, 2013

(51) Int. Cl.
  *G06F 7/04*     (2006.01)
  *G06F 11/30*    (2006.01)
  *H04L 9/32*     (2006.01)

(52) U.S. Cl.
  USPC ............... 726/2; 726/26; 726/27; 713/168; 713/169; 713/189

(58) Field of Classification Search
  USPC ............... 726/26, 2, 27; 713/168, 169, 189
  See application file for complete search history.

(56) References Cited

U.S. PATENT DOCUMENTS

| | | | |
|---|---|---|---|
| 7,890,604 B2 | 2/2011 | Millington et al. | |
| 2003/0095648 A1* | 5/2003 | Kaib et al. | 379/106.02 |
| 2005/0235278 A1* | 10/2005 | Wu et al. | 717/168 |
| 2009/0019105 A1 | 1/2009 | Sebastian | |

FOREIGN PATENT DOCUMENTS

EP    1336923 A2 *    8/2003

OTHER PUBLICATIONS

Patil, et al., "Towards Fine-Grained Access Control in JavaScript Contexts", Retrieved at <<http://www.comp.nus.edu.sg/~patilkr/papers/JCShadow.pdf>>, Proceedings of 31st IEEE International Conference on Distributed Computing Systems, Jun. 2011, pp. 10.

Adida, et al., "Rootkits for JavaScript Environments", Retrieved at <<http://www.usenix.org/event/woot09/tech/full_papers/adida.pdf>>, Proceedings of the 3rd USENIX conference on Offensive technologies (WOOT), Aug. 10, 2009, pp. 7.

Barth, et al., "Protecting Browsers from Extension Vulnerabilities", Retrieved at <<http://www.eecs.berkeley.edu/Pubs/TechRpts/2009/EECS-2009-185.pdf>>, Dec. 18, 2009, pp. 1-12.

Chong, et al., "SIF: Enforcing Confidentiality and Integrity in Web Applications", Retrieved at <<http://www.cs.cornell.edu/andru/papers/sif.pdf>>, 16th USENIX Security Symposium, Sep. 20, 2007, pp. 16.

(Continued)

*Primary Examiner* — Mohammad W Reza
(74) *Attorney, Agent, or Firm* — Wolfe-SBMC (57) ABSTRACT

Various embodiments provide an ability to isolate execution of trusted content and/or script from execution of untrusted content and/or script. Separate contexts and/or execution environments can be used for the trusted content and untrusted content, respectively. A trusted context and/or execution environment associated with execution of trusted content can be configured to enable access to sensitive resources associated with a computing device. An untrusted context and/or execution environment associated with execution of untrusted content can be configured with limited and/or no access to the sensitive resources. Alternately or additionally, data generated within the untrusted context can be transferred to the trusted context in a benign manner.

20 Claims, 5 Drawing Sheets

OTHER PUBLICATIONS

Jackson, et al., "Subspace: Secure Cross-Domain Communication for Web Mashups", Retrieved at <<http://citeseerx.ist.psu.edu/viewdoc/download?doi=10.1.1.123.1586&rep=rep1&type=pdf>>, Proceedings of the 16th international conference on World Wide Web (IW3C2), May 8-12, 2007, pp. 10.

Jim, et al., "Defeating Script Injection Attacks with Browser-Enforced Embedded Policies", Retrieved at <<http://www2007.org/papers/paper595.pdf>>, Proceedings of the 16th international conference on World Wide Web, May 8-12, 2007, pp. 601-610.

Kirda, et al., "Noxes: A Client-Side Solution for Mitigating Cross-Site Scripting Attack", Retrieved at <<http://www.seclab.tuwien.ac.at/papers/noxes.pdf>>, Proceedings of the ACM symposium on Applied computing, Apr. 23-27, 2006, pp. 8.

* cited by examiner

```
<script>
        function jsonFlickrApi(jsonData) {
            // use jsonData here…
        }
<script>
```

```
<script msExposeCallbackFunction="jsonFlickrApi" src="http://www.flickr.com/services/rest/?method=flickr.test.echo&format=json&api_key=6a1b5384b" />
```

SEPARATE SCRIPT CONTEXT TO ISOLATE MALICIOUS SCRIPT

BACKGROUND

Computing devices today enable a user to run various types of applications. As such, applications can be created in many different ways. Traditionally, a developer uses a programming language to write source files that are compiled into an executable output. The executable output can then be loaded into memory of the computing device and run by the computing device's processor. More recently, modern applications use techniques applied to web page development to create web applications. For example, an application can be written using a scripting language. Applications composed of one or more scripting language files can be executed by loading the files into a hosting application and/or environment (e.g. a web browser and/or scripting engine). The hosting application then processes the files and, subsequently, executes the associated application.

In some cases, application script files can be downloaded from remote locations and stored on the computing device. When a user desires to run the application, the downloaded content can be selected and run in a manner as described above. However, sometimes the application can be further configured to acquire additional data and/or script from a remote location at runtime. When properly used, the additional data and/or script add flexibility to the executing application. Unfortunately, malicious parties often attempt to usurp the data and/or script and replace it with data and/or script designed to do harm. For example, some applications execute in an environment with extensive access to the user data and/or sensitive information stored on the computing device. Without proper security measures in place, the malicious parties can gain desired access to these resources.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments provide an ability to isolate execution of trusted content and/or script from execution of untrusted content and/or script. Separate contexts and/or execution environments can be used for the trusted content and untrusted content, respectively. A trusted context and/or execution environment associated with execution of trusted content can be configured to enable access to sensitive resources associated with a computing device. An untrusted context and/or execution environment associated with execution of untrusted content can be configured with limited and/or no access to the sensitive resources. Alternately or additionally, data generated within the untrusted context can be transferred to the trusted context in a benign manner.

BRIEF DESCRIPTION OF THE DRAWINGS

The same numbers are used throughout the drawings to reference like features.

DETAILED DESCRIPTION

Overview

Various embodiments provide an ability to isolate execution of trusted content and/or script from execution of untrusted content and/or script. Trusted content can execute in a first scripting context with access to sensitive resources of a computing device. In some embodiments, remote content acquired during a runtime of the trusted content can execute in a second scripting context that is isolated from the first scripting context. Alternately or additionally, the second scripting context can have reduced and/or no access to the sensitive resources. Data generated in the second scripting context via the remote content can be manipulated to prevent undesired access to the sensitive resources when transferred to the first scripting context.

In the discussion that follows, a section entitled "Operating Environment" is provided and describes one environment in which one or more embodiments can be employed. Following this, a section entitled "Separate Scripting Contexts" describes how multiple scripting contexts can be used to enforce secure access to sensitive resources. Next, a section entitled "Isolating Execution of Remote Content" describes how access to remote content can be identified and isolated. Last, a section entitled "Example System" describes an example system that can be utilized to implement one or more embodiments.

Having provided an overview of various embodiments that are to be described below, consider now an example operating environment in which one or more embodiments can be implemented.

Operating Environment

Figure 1:
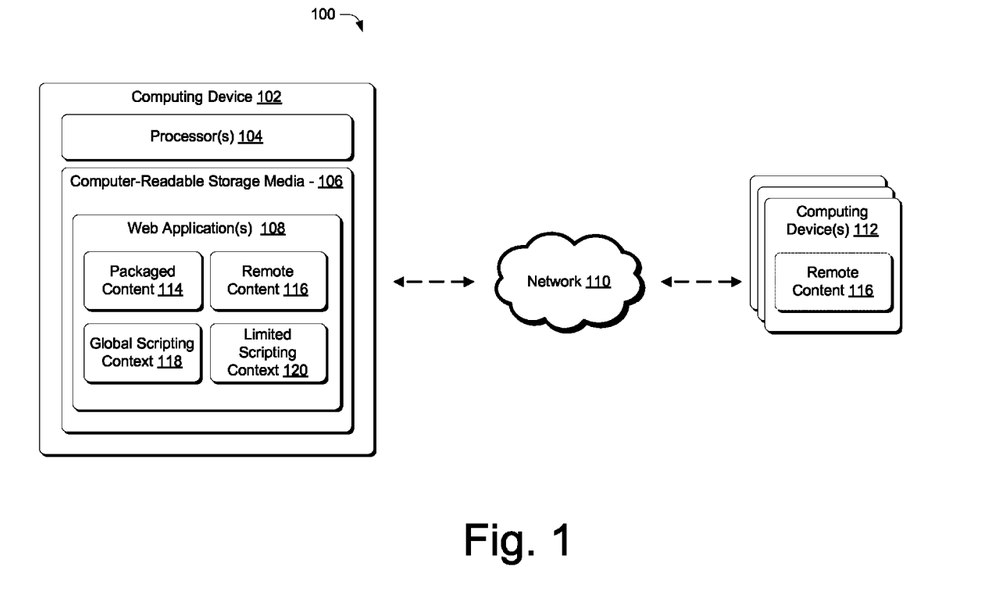
FIG. 1 illustrates an operating environment in which various principles described herein can be employed in accordance with one or more embodiments.

FIG. 1 illustrates an operating environment in accordance with one or more embodiments, generally at 100. Environment 100 includes a computing device 102 having one or more processor(s) 104, and one or more computer-readable storage media 106. The computer-readable storage media can include, by way of example and not limitation, all forms of volatile and non-volatile memory and/or storage media that are typically associated with a computing device. Such media can include computer-readable hardware storage media like ROM, RAM, flash memory, hard disk, removable media, etc. One specific example of a computing device is shown and described below in FIG. 5.

In addition, computing device 102 includes one or more web application(s) 108. Web application(s) 108 represent hostable-application(s), such as an application that can be hosted by a browser application and/or a script engine. In some embodiments, web application(s) 108 can be written in script and/or markup languages, as further described below. Content associated with web application(s) 108 can be downloaded to computing devices 102 through network 110 from one or more remote computing device(s) 112.

Network 110 represents one or more data communication networks and/or links. For example, the network 110 may include a wide area network (WAN), a local area network (LAN), a wireless network, an intranet, the Internet, and so on.

Computing device(s) 112 represents one or more device from which a web application can be downloaded, such as over network 110. Computing device(s) 112 can be any suitable type of device, such as a computing device configured as a server, a content distributor, and the like.

Web application(s) 108 includes packaged content 114. Package content 114 represents content associated with a web application that is downloaded prior to the web application executing. In some embodiments, package content to 114 can represent the script and/or markup language that encompass and/or compose web application(s) 108.

Web application(s) 108 also includes remote content 116. Remote content 116 represents content acquired and/or requested by a web application(s) 108 at runtime. Alternately or additionally, remote content 116 represents content not downloaded initially as part of the web application. In some embodiments, computing device 102 downloads remote content 116 over network 110. Remote content 116 can be downloaded from a computing device that was used to acquire packaged content 114, a separate computing device than that which was used to acquire packaged content 114, and/or a third party computing device. Here, remote content 116 is illustrated as originating on computing device(s) 112 and transmitted via network 110 to computing device 102 during runtime of web application(s) 108. Remote content 116 can include script files, scripting objects, markup language files, data, and the like. In some embodiments, remote content 116 can be mixed together with packaged content 114 dynamically at runtime.

Computing device 102 also includes global scripting context 118 and limited scripting context 120. While illustrated in FIG. 1 as being included in web application 108, it is to be appreciated and understood that global scripting context 118 and/or limited scripting context 120 can be implemented as modules separate and/or independent of web application 108 without departing from the spirit of the claimed subject matter. For example, global scripting context 118 and/or limited scripting context 120 can represent separate software modules configured to run packaged content 114 and/or remote content 116 in order to actualize web application 108.

Global scripting context 118 represents a scripting context, scripting engine, and/or script execution environment that has access to sensitive resources associated with computing device 102. This can include access to particular operating system functionality and/or software interfaces, user public and/or private data, user picture libraries, user files, passwords, history information, system resources, etc. In some embodiments, scripts running in global scripting context 118 have access to the sensitive resources as well.

Limited scripting context 120 represents a scripting context, scripting engine, and/or script execution environment that does not have access to sensitive resources associated with computing device 102. Some embodiments enable packaged content 114 running in global scripting context 118 to selectively execute remote content, such as remote content 116, in limited scripting context 120, as further described below.

Computing device 102 can be embodied as any suitable computing device such as, by way of example and not limitation, a desktop computer, a portable computer, a notebook computer, a handheld computer such as a personal digital assistant (PDA), cell phone, and the like.

Having described an example operating environment, consider now a discussion of separate scripting contexts in accordance with one or more embodiments.

Separate Scripting Contexts

As described above, an application, such as a web application, can be created through executable script and/or markup language files and a hosting environment. Typically, installing a web application includes downloading these files to a computing device that contains the hosting application (e.g. a web browser and/or script engine). To execute the web application, the downloaded files are loaded into the hosting application and executed local to the computing device. In most scenarios, the web application script files are acquired from a presumably trusted source, such as a content distributor or known server. As such, the script files are usually given access to sensitive resources associated with the computing device. In some cases, the script and/or markup language files attempt access to remote content at runtime. Oftentimes, the remote content can include passive and/or inactive content, such as the data value or image. Other times, the remote content can include active content, such as additional script configured to generate requested data. Unfortunately, malicious parties desiring access to the sensitive resources sometimes usurp the active content and/or replace it with undesirable script.

Consider an example where remote content consists of additional script. At runtime, the web application acquires and runs the additional script, typically in the same execution environment as the web application. If the additional script executes in the same execution environment as the web application, the additional script has the same access to the same sensitive resources. Thus, when malicious parties replace and/or modify the additional script, the modified script also has access to the same sensitive resources. For example, remote content can consist of JavaScript Object with Padding (JSONP) script. JSONP can be executed as JavaScript configured to generate data. Malicious parties can intercept and/or influence the JSONP script and/or data that gets downloaded and/or generated without the web application's knowledge. When the web application loads and/or runs the influenced JSONP script, malicious parties can acquire data that would otherwise be secure. For example, JSONP script can sometimes use a standardized <script> tag that is also used by Java script associated with a web site. Malicious parties can attempt to replace the JSONP script with malicious code and, subsequently, run APIs, access cookies, etc. that would otherwise be protected. In this scenario, the web site becomes under control of the malicious parties. Consequently, without knowledge of whether the remote script can be trusted or not, a computing device's sensitive resources can potentially be exposed to undesirable parties.

Various embodiments provide an ability to isolate execution of trusted content and/or script from execution of untrusted content and/or script. A first scripting context can be used for execution of trusted content, where the first scripting context has access to sensitive resources of a computing device. A second scripting context can be used for execution untrusted context, where the second scripting context has limited and/or no access to sensitive resources of the computing device.

Figure 2:
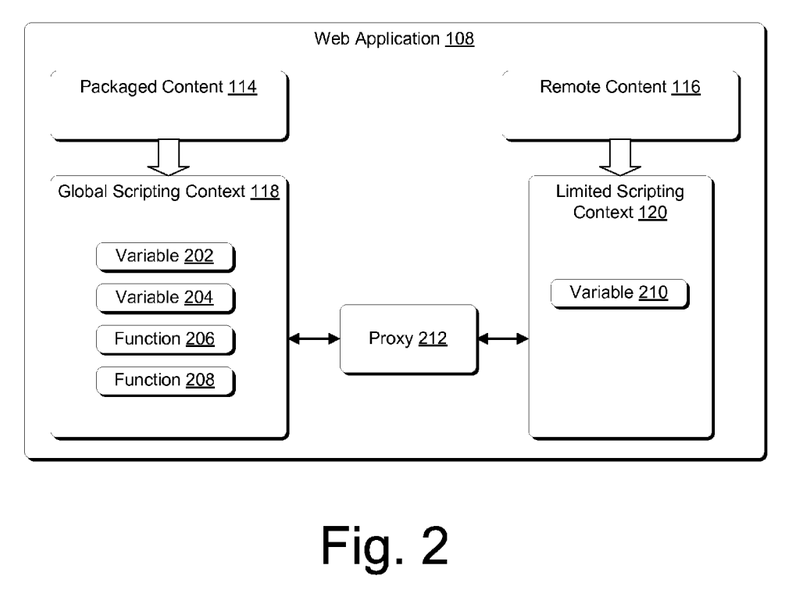
FIG. 2 illustrates an example implementation in accordance with one or more embodiments.

Consider FIG. 2, which illustrates a more detailed example implementation in accordance with one or more embodiments, such as that described in FIG. 1. However, some elements of FIG. 1 have not been included in FIG. 2 for the sake of brevity.

As discussed above, web application 108 represents a hostable-application. A web application can be written in any suitable script and/or markup language, such as HyperText Markup Language (HTML), eXtensible Markup Language (XML), JavaScript, PostScript, and the like. Additionally, web application 108 can reside on any suitable type of computing device. In some cases, the script and/or markup language reside in one or more files that reside local to the computing device. For instance, the file(s) can be acquired and/or downloaded from a second computing device. These files embody web application 108, and can be considered trusted and/or packaged content, such as packaged content 114. In other cases, the script and/or markup language file(s) can be part of a remote web site being accessed by a web browser.

As part of the execution of web application 108, packaged content 114 can be loaded into global scripting context 118. Consequently, packaged content 114 has access to sensitive and/or system resources associated with the computing device. During execution, packaged content 114 can employ variables and/or functions to achieve desired results. In this example, packaged content 114 accesses and/or generates variables 202 and 204, as well as calls and/or executes functions 206 and 208.

In some cases, packaged content can reference remote content and/or content not initially downloaded with web application 108. In this example, function 206, running in global scripting context 118, references and/or attempts access to remote content associated with variable 210. Here, variable 210 represents data generated during execution of remote content 116. To access variable 210, remote content 116 is downloaded and executed. However, instead of running remote content 116 within global scripting context 118, a separate context can be started. Thus, in some embodiments, when a reference to remote content has been identified, the remote content and/or execution of the remote content can be isolated from trusted content, as further described below.

Upon identifying a reference to remote content, web application 108 starts a new scripting context, such as limited scripting context 120. Unlike global scripting context 118, limited scripting context 120 has little and/or no access to the sensitive and/or system resources. In some embodiments, limited scripting context 120 has limited and/or no communication mechanisms with other scripting contexts. For instance, in some embodiments, limited scripting context 120 can only communicate with global scripting context 118 through communication mechanisms provided by web application 108 and/or the hosting application. Since limited scripting context 120 is a separate scripting context from a global scripting context 118, scripts running within limited scripting context 120 are inherently isolated. Functions and/or variables that exist in limited scripting context 120 are independent of functions and/or variables that exist in global scripting context 118. When remote content 116 executes within limited scripting context 120, variables and/or functions utilized by remote content 116, such as variable 210, have no visibility into global scripting context 118, and are subsequently isolated.

In addition to isolating execution of scripts in separate contexts and/or execution environments, interactions between the separate contexts can be isolated. For example, the execution environments can be configured to disallow direct the interactions between one another. Alternately or additionally, the execution environments can contain reduced communication capabilities, such as exposing only one or two Application Programming Interfaces (APIs) associated with communication. In some embodiments, a proxy, such as proxy 212, can be used to broker interactions between multiple execution environments. Here, proxy 212 brokers communication between global scripting context 118 and limited scripting context 120. Instead of directly accessing limited scripting context 120, global scripting context 118 sends and/or receives data through proxy 212. In some cases, proxy 212 can be configured to perform various types of data validation and/or security measures. Alternately or additionally, one or more objects created within the new scripting context can be exposed as read-only objects to other scripting contexts, thus enabling a more privileged scripting context to read data out of a less privileged scripting context.

When the packaged content 114 references remote content 116, typically some form of output is desired, such as data generated through execution of remote content. To ensure that data can be trusted and/or safely transferred into global scripting context 118, objects and/or data variables created by remote content can be transferred in a benign format (e.g. a format without active content/script). For instance, data generated via remote content 116 in limited scripting context 120 can be converted to a string prior to being sent to global scripting context 118. A string conversion can clip and/or remove any functions and/or code that could be attached to the generated data. This can be achieved in any suitable manner. For example, a string conversion can execute within limited scripting context 120 prior to being transferred to proxy 212 and/or global scripting context 118. In other embodiments, unconverted data can be sent to proxy 212. Proxy 212 can then convert the data to a string, convert the string back to data, and/or be configured to perform the data validation or any other suitable type of security enforcement.

Continuing with the string conversion example, when global scripting context 118 receives a string format for data, global scripting context 118 can convert the string back to an expected object type and/or appropriate data format safely and without unwanted functions. In other embodiments, properties associated with an object can be verified prior to receipt in the global scripting context. For example, raw data (e.g. variable 210) can be transferred to proxy 212 and validated. If verification of properties fails, then the data can be refused by the global scripting context and/or not forwarded from proxy 212.

By isolating remote content acquired during runtime, a web application can safely utilize web services and ensure that data returned to the web application does not include malicious content.

Having considered the usage of separate scripting contexts, consider now a discussion of identification of isolation of remote content that is in accordance with one or more embodiments.

Isolating Execution of Remote Content

When scripting and/or markup files are considered to be trustworthy, a hosting environment associated with the files can be configured to allow access to otherwise protected resources. To further protect these resources, the scripting and/or markup files can be monitored for access to questionable content (e.g. remote and/or unknown content). When access to questionable and/or remote content is identified, execution of the questionable/remote content can be isolated to prevent malicious parties from compromising a computing device's security.

Figure 3:
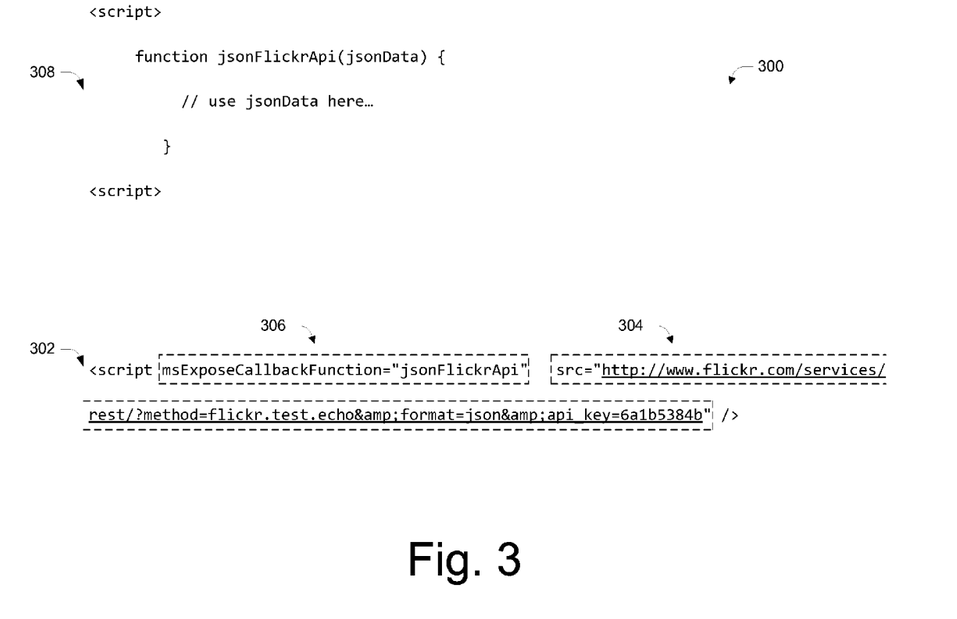
FIG. 3 illustrates example code in accordance with one or more embodiments.

Consider FIG. 3, which illustrates example code, shown generally at 300, that is in accordance with one or more embodiments While this particular example illustrates HTML code, it is to be appreciated and understood that any suitable scripting language and/or markup language can be used without departing from the spirit of the claimed subject matter.

Code 300 represents HTML code downloaded as part of a web application. For the sake of brevity, the web application code is not included in its entirety. While this particular example describes code 300 in context associated with a web application, it is to be appreciated and understood that code 300 can be associated with other types of applications and/or implementations without departing from the spirit of the claimed subject matter. In some embodiments, code 300 can be determined trustworthy code, and subsequently given access to sensitive resources associated with a computing device. Code can be determined trustworthy in any suitable fashion. For instance, the code can be determined trustworthy by determining where it was acquired from (e.g. domain and/or Internet Protocol (IP) address information), determining and/or trusting the code was not tampered with during transmission (e.g. using a secure connection with a cryptographic certificate, a Hypertext Transfer Protocol Secure (HTTPS), Transport Layer Security (TLS), Secure Sockets Layer (SSL)), etc.

Code 300 includes script tag 302. Script tags can be configured to contain script statements, such as, but not limited to, a JavaScript statement. Alternately or additionally, a script tag can point to an external script file. Script tag 302 includes a reference 304 to remote content that has not been downloaded as part of code 300:

"src='http://www.flickr.com/services/rest/
?method=flickr.test.echo&form at=json&api key=6a1b5384b'"

In some embodiments, non-local/remote access can be determined through identification of a particular attribute and/or property, such as a source attribute. Here, reference 304 specifies a non-local/remote address through attribute "src". Alternately or additionally, non-local/remote access can be determined through identification of properties associated with an address (e.g. 'http' and/or 'www.flickr.com').

When non-local/remote access has been identified, a new scripting context and/or execution environment can be initiated. In some cases, the new scripting context has limited and/or no access to sensitive resources associated with a computing device. Any suitable type of scripting context can be started, such as a scripting context can be configured to run JavaScript, VisualBasic, etc. In some cases, the type of scripting context to start can be determined from information contained within the script tag. Responsive to starting the new scripting context, content specified by the non-local address can be downloaded and executed within the new scripting context, thus isolating any potentially malicious content associated with the remote content.

In addition to specifying remote content, script tag 302 includes a callback reference 306. Callback reference 306 specifies a callback function to be called when execution of the non-local/remote content has completed. In general, a callback function can be configured to be callable by a lower-level and/or different software layer. For example, in some embodiments, callback reference 306 can be configured to be callable from a first scripting context (e.g. a limited scripting context), but executed in a second scripting context (e.g. a global scripting context). Thus, as a script completes execution in the first scripting context, it can call the callback function and/or trigger execution of the callback function in the second scripting context. In this example, a callback function is setup as "jsonFlickrApi" by storing an associated name in "msExposeCallbackFunction".

Callback code 308 includes coding statements that implement the callback function specified by callback reference 306. In some embodiments, callback code 308 can be downloaded as a part of code 300 and run in the same scripting context as the rest of code 300. In this example, callback function "jsonFlickrApi" has an input parameter of "jsonData". When "jsonFlickrApi" executes, any data passed into "jsonFlickrApi" exists and/or runs in the same context as "jsonFlickrApi". Thus, whatever resources "jsonFlickrApi" has access to, "jsonData" has access to as well. In some cases, "jsonData" can be data, script, and/or other forms of information generated by remote content. When "jsonData" has been compromised by malicious parties, the malicious parties can access information that is otherwise protected.

In some embodiments, a "stub" method with a same name as the specified callback function can be inserted into the new scripting context for execution. For example, when a callback function has been identified in the script tag with remote content access, a "stub" method of the same name can be generated and/or inserted into the new scripting context and configured to handle data generated by the remote content. Alternately or additionally, the "stub" can be configured as a proxy between the new scripting context and the global scripting context, such as that illustrated in FIG. 2. A "stub" method can be used as a substitute method within the new scripting context and configured to provide additional security associated with data generated within the new scripting context. For instance, the "stub" can be configured to validate and/or convert data, such as converting data to a string. Data generated by remote content in the new scripting context can be passed in as a parameter to the "stub" and subsequently converted. Alternately or additionally, the "stub" can be configured to validate each attribute associated with the data, return a structured clone object associated with the data, convert data to an image, and the like. When remote content running in the new scripting context calls a specified callback function, the "stub" method of the same name is called instead. In this manner, data can be generated by remote content in an isolated environment and converted to a passive and/or benign format. Once data has either been verified and/or converted, it can be safely transferred to the global scripting context.

Upon receipt of data, the global scripting context can deserialize and/or convert the data back into a corresponding object associated with the global scripting context. The global scripting context can be configured to call an original version of the callback function named in callback reference 306, and defined in callback code 308, with a safe version of the received data. Accordingly, a calling web application can obtain data dynamically from remote content without risk of potential side effects from malicious parties.

Figure 4:
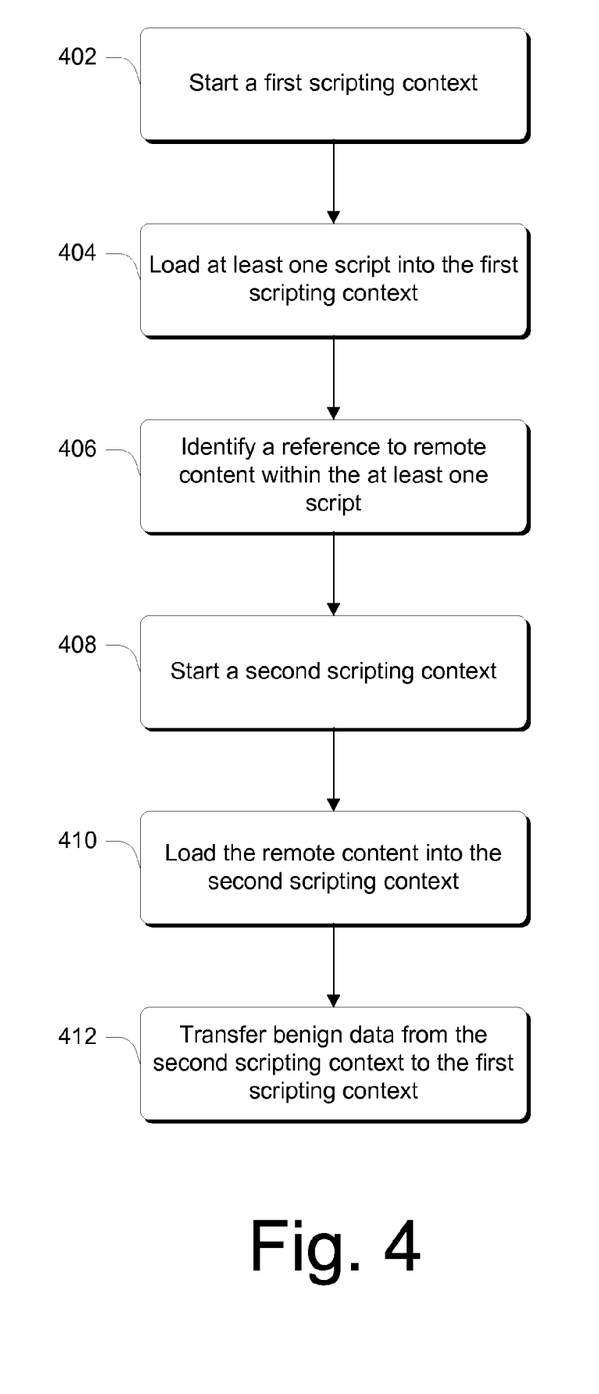
FIG. 4 is a flow diagram that describes steps in a method in accordance with one or more embodiments.

FIG. 4 illustrates a flow diagram of a method in accordance with one or more embodiments. The method can be implemented in connection with any suitable hardware, software, firmware or combination thereof. In at least some embodiments, aspects of the method can be implemented by a suitably configured device, such as computing device 102 (FIG. 1).

Step 402 starts a first scripting context. For example, the first scripting context can be a scripting engine configured with access to sensitive resources associated with a computing device, examples of which are provided above. Any suitable type of scripting context can be started, such as an HTML script engine, XML script engine, JavaScript script engine, and the like. The scripting context can be a stand-alone application, a separate thread of a multi-threaded application, a software module included as part of an application, and the like.

Responsive to starting the first scripting context, step 404 loads at least one script into the first scripting context. The script can be any suitable type of script, such as script and/or markup files that implement a web application. Alternately or additionally, the script can include syntax associated with any suitable scripting language and/or markup language. In some embodiments, the script resides local to a computing device on which the first scripting context runs.

Step 406 identifies a reference to remote content within the script(s). For example, a script tag can include an attribute associated with a Uniform Resource Locator (URL) that points to content remote from the computing device. In some embodiments, the script tag can include a description of a format the remote content is in. For instance, the format description can indicate that the remote content contains JavaScript, JavaScript Object Notation (JSON), JSONP, or any other suitable type of script and/or markup language.

Responsive to identifying a reference to remote content, step 408 starts a second scripting context. In some embodiments, the second scripting context can be associated with the format description associated with the remote content. If the format description indicates remote content contains JSON, a scripting engine associated with JSON can be started. As described above, in some embodiments, the second scripting context can be configured with limited, reduced, and/or no access to sensitive resources associated with the computing device.

Step 410 loads the remote content into the second scripting context. Loading the remote content into the second scripting context can include loading and executing the remote content. In some cases, the remote content can be configured to generate at least some data.

Responsive to loading the remote content, step 412 transfers benign data from the second scripting context to the first scripting context. Benign data can be constructed in any suitable format, such as a string, a validated object, and the like. Alternately or additionally, benign data represents any type of data that has been converted, validated, verified, and/or modified into a trusted format. Data can be transferred from the second scripting context to the first scripting context in any suitable way. For example, the second scripting context can transfer data via a callback function, a proxy, a dedicated API, and the like. In some embodiments, the second scripting context does not have direct access into the first scripting context in order to further isolate the scripting context.

Access to remote content in a script can be identified to enable isolation of the remote content when executed on a computing device. Having considered a discussion on identification and isolation of remote content, consider now an example system in accordance with one or more embodiments.

Example System

Figure 5:
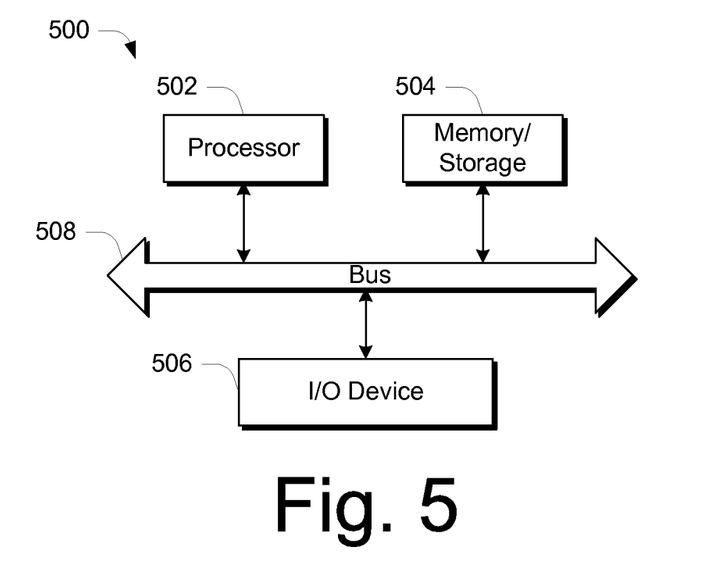
FIG. 5 illustrates an example system that can be utilized to implement one or more embodiments

FIG. 5 illustrates an example computing device 500 that can be used to implement the various embodiments described above. Computing device 500 can be, for example, computing device 102 of FIG. 1 or any other suitable computing device.

Computing device 500 includes one or more processor(s) or processing unit(s) 502, one or more memory and/or storage component(s) 504, one or more input/output (I/O) devices 506, and a bus 508 that allows the various components and devices to communicate with one another. Bus 508 represents one or more of any of several types of bus structures, including a memory bus or memory controller, a peripheral bus, an accelerated graphics port, and a processor or local bus using any of a variety of bus architectures. Bus 508 can include wired and/or wireless buses.

Memory/storage component 504 represents one or more computer hardware storage media. Component 504 can include volatile media (such as random access memory (RAM)) and/or nonvolatile media (such as read only memory (ROM), Flash memory, optical disks, magnetic disks, and so forth). Component 504 can include fixed media (e.g., RAM, ROM, a fixed hard drive, etc.) as well as removable media (e.g., a Flash memory drive, a removable hard drive, an optical disk, and so forth).

One or more input/output device(s) 506 allow a user to enter commands and information to computing device 500, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer-readable storage media".

"Computer-readable storage media" include volatile and non-volatile, removable and non-removable hardware media implemented in any method or technology for storage of information such as computer readable instructions, data structures, program modules, or other data. Computer-readable hardware storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

CONCLUSION

Various embodiments provide an ability to isolate execution of trusted content and/or script from execution of untrusted content and/or script. Separate contexts and/or execution environments can be used for the trusted content and untrusted content, respectively. A trusted context and/or execution environment associated with execution of trusted content can be configured to enable access to sensitive resources associated with a computing device. An untrusted context and/or execution environment associated with execution of untrusted content can be configured with limited and/or no access to the sensitive resources. Alternately or additionally, data generated within the untrusted context can be transferred to the trusted context in a benign manner.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method comprising:
    starting a first scripting context that has access to at least some resources associated with a computer;
    loading at least one script into the first scripting context;
    identifying a reference to remote content within the at least one script, the remote content being remote from the computer;
    responsive to identifying the reference to remote content, starting a second scripting context that does not have access to the at least some resources associated with the computer;
    loading the remote content into the second scripting context for execution; and transferring data associated with the remote content from the second scripting context to the first scripting context.

2. The computer-implemented method of claim 1, the at least some resources comprising at least some operating system software interfaces associated with the computer.

3. The computer-implemented method of claim 1, the first scripting context configured to execute script associated with HyperText Markup Language (HTML).

4. The computer-implemented method of claim 1 further comprising:
   identifying a callback function associated with the remote content; and
   inserting a stub method associated with the callback function into the second scripting context to enable said transferring data associated with remote content in a benign format.

5. The computer-implemented method of claim 4 further comprising:
   calling the callback function in the first scripting context after the stub method executes in the second scripting context effective to process the transferred data.

6. The computer-implemented method of claim 4, the transferring data associated with remote content in a benign format further comprising converting the data into at least one string.

7. The computer-implemented method of claim 1, the identifying a reference to remote content comprising identifying the reference to remote content through identification of a Uniform Resource Locator (URL).

8. The computer-implemented method of claim 1 further comprising disallowing direct communication between the first scripting context and the second scripting context.

9. One or more computer-readable storage memory comprising computer-readable instructions that are executable to:
   identify an attribute associated with remote content that is referenced within at least one scripting file, the at least one scripting file being local to a computing device, the remote content being remote from the computing device;
   responsive to identifying the attribute, start a scripting context that does not have access to at least some resources associated with the computing device;
   load the remote content into the scripting context, the remote content being configured to generate at least some data; and
   transfer the at least some data to a second scripting context in a trusted format.

10. The one or more computer-readable storage memory of claim 9, the trusted format comprising a string format.

11. The one or more computer-readable storage memory of claim 9, the computer-readable instructions further executable to convert the trusted format into a data format associated with the second scripting context.

12. The one or more computer-readable storage memory of claim 9, the instructions to identify an attribute associated with remote content further comprising instructions to identify a source attribute contained within a script tag.

13. The one or more computer-readable storage memory of claim 9, the instructions to transfer the at least some data further comprising instructions to transfer the at least some data to the second scripting context via a proxy.

14. The one or more computer-readable storage memory of claim 9, the instructions further comprising instructions to download the remote content to the computing device.

15. The one or more computer-readable storage memory of claim 9, the second scripting context associated with a web browser.

16. One or more computer-readable storage memory comprising computer readable instructions which, responsive to execution by at least one processor, implement:
   one or more global scripting context modules configured to:
     execute packaged content associated with a web application; and
     enable identification of remotely referenced and accessible content within the packaged content;
   one or more limited scripting context modules configured to:
     process the remotely referenced and accessible content identified within the packaged content; and
     generate data associated with the remotely referenced and accessible content; and
   one or more proxy modules configured to:
     broker interactions between the one or more global scripting context modules and the one or more limited scripting context modules; and
     enable transfer of the data associated with the remotely referenced and accessible content, in a benign format, from a limited scripting context associated with the one or more limited scripting context modules to a global scripting context associated with the one or more global scripting context modules.

17. The one or more computer-readable storage memory of claim 16, the packaged content comprising one or more HyperText Markup Language (HTML) files.

18. The one or more computer-readable storage memory of claim 16, the limited scripting context associated with the one or more limited scripting context module configured to execute JavaScript Object with Padding (JSONP) script.

19. The one or more computer-readable storage memory of claim 16, the one or more proxy modules further configured to perform validation on the data associated with the remotely referenced and accessible content.

20. The one or more computer-readable storage memory of claim 16, the one or more global scripting context modules further configured to:
   receive the data associated with the remotely referenced and accessible content; and
   convert the data in the benign format to a data format associated with and useable by the global scripting context.

* * * * *